(12) United States Patent　　　(10) Patent No.: US 8,091,672 B2
Gutsch et al.　　　(45) Date of Patent: Jan. 10, 2012

(54) SINGLE-DRIVE-AXIS VEHICLE WITH A PLATFORM AND/OR A SEAT FOR A DRIVER

(75) Inventors: Andreas Gutsch, Luedinghausen (DE); Michael Schulze, Duelmen/Buldern (DE); Holger Bramsiepe, Wuppertal (DE)

(73) Assignee: Evonik Degussa GmbH, Essen (DE)

( * ) Notice: Subject to any disclaimer, the term of this patent is extended or adjusted under 35 U.S.C. 154(b) by 214 days.

(21) Appl. No.: 12/234,278

(22) Filed: Sep. 19, 2008

(65) Prior Publication Data

US 2009/0078485 A1　　Mar. 26, 2009

(30) Foreign Application Priority Data

Sep. 20, 2007　(DE) .......................... 10 2007 045 146

(51) Int. Cl.
　　*B62D 61/00*　　(2006.01)
　　*B60K 1/00*　　(2006.01)
　　*A47L 11/00*　　(2006.01)
(52) U.S. Cl. ....... 180/218; 15/340.3; 15/340.4; 15/49.1; 15/78; 15/87; 15/98; 180/65.1; 280/63
(58) Field of Classification Search .................. 15/49.1, 15/52, 78, 87, 98, 340.1, 340.3, 340.4; 37/231, 37/241, 242, 243, 244; 180/210, 215, 216, 180/218, 65.1, 908; 280/62, 63, 32.7
See application file for complete search history.

(56) References Cited

U.S. PATENT DOCUMENTS

| 2,205,671 | A | * | 6/1940 | Sarber | 15/49.1 |
| 2,465,037 | A | * | 3/1949 | Ream | 280/5.32 |
| 4,115,890 | A | * | 9/1978 | Burgoon | 15/49.1 |
| 5,386,742 | A | * | 2/1995 | Irikura et al. | 74/665 F |
| 5,701,965 | A | * | 12/1997 | Kamen et al. | 180/7.1 |
| 6,088,873 | A | * | 7/2000 | Pacchini et al. | 15/320 |
| 6,096,173 | A | | 8/2000 | Von Hippel et al. | |
| 6,302,230 | B1 | * | 10/2001 | Kamen et al. | 180/171 |
| 6,371,228 | B1 | * | 4/2002 | Husted et al. | 180/65.1 |
| 6,458,750 | B1 | | 10/2002 | Dardin et al. | |
| 7,155,768 | B2 | * | 1/2007 | Morita et al. | 15/98 |
| 7,192,040 | B2 | * | 3/2007 | Xie | 280/93.502 |
| 7,235,298 | B2 | | 6/2007 | Katusic et al. | |
| 7,288,501 | B2 | | 10/2007 | Auer et al. | |
| 7,374,743 | B2 | | 5/2008 | Katusic et al. | |

(Continued)

FOREIGN PATENT DOCUMENTS

JP　　63304916 A　* 12/1988

OTHER PUBLICATIONS

U.S. Appl. No. 60/021,600, filed Jul. 11, 1996, Riemenschneider et al.

(Continued)

*Primary Examiner* — Paul N Dickson
*Assistant Examiner* — Laura Freedman
(74) *Attorney, Agent, or Firm* — Oblon, Spivak, McClelland, Maier & Neustadt, L.L.P.

(57) ABSTRACT

An electrically driven single-drive-axis vehicle with a platform for a driver, driven about a common wheel axis, which provides the single-drive-axis to improve its handling and its range of uses. The vehicle includes at least one attachment, the attachment being connected to the single-axle vehicle pivotably about at least one first attachment axis.

32 Claims, 7 Drawing Sheets

U.S. PATENT DOCUMENTS

| | | | |
|---|---|---|---|
| 7,407,175 B2* | 8/2008 | Kamen et al. | 280/204 |
| 7,525,788 B2 | 4/2009 | Hoerpel et al. | |
| 7,703,568 B2* | 4/2010 | Ishii | 180/218 |
| 7,717,200 B2* | 5/2010 | Kakinuma et al. | 180/6.5 |
| 2001/0036437 A1 | 11/2001 | Gutsch et al. | |
| 2001/0055639 A1 | 12/2001 | Moritz et al. | |
| 2003/0041578 A1* | 3/2003 | Fuller | 56/12.7 |
| 2003/0206854 A1 | 11/2003 | Gutsch et al. | |
| 2004/0034954 A1* | 2/2004 | Morita et al. | 15/98 |
| 2005/0221192 A1 | 10/2005 | Hennige et al. | |
| 2007/0175362 A1 | 8/2007 | Gutsch et al. | |
| 2007/0184993 A1 | 8/2007 | Scherer et al. | |
| 2007/0213237 A1 | 9/2007 | Scherer et al. | |
| 2007/0219101 A1 | 9/2007 | Scherer et al. | |
| 2007/0254178 A1 | 11/2007 | Nun | |
| 2008/0020190 A1 | 1/2008 | Nun et al. | |
| 2008/0032197 A1 | 2/2008 | Horpel et al. | |
| 2008/0084686 A1 | 4/2008 | Gutsch et al. | |
| 2008/0138700 A1 | 6/2008 | Horpel et al. | |
| 2008/0280050 A1 | 11/2008 | Nun et al. | |
| 2008/0283171 A1 | 11/2008 | Nun et al. | |
| 2008/0305702 A1 | 12/2008 | Nun et al. | |
| 2010/0000079 A1 | 1/2010 | Horpel et al. | |
| 2010/0003401 A1 | 1/2010 | Horpel et al. | |

OTHER PUBLICATIONS

U.S. Appl. No. 08/842,775, filed Apr. 17, 1997, Riemenschneider et al.

U.S. Appl. No. 09/441,439, filed Nov. 17, 1999, Barthold et al.

U.S. Appl. No. 60/194,367, filed Apr. 4, 2002, Michael et al.

U.S. Appl. No. 12/746,683, filed Jun. 7, 2010, Hedrich et al.

* cited by examiner

SINGLE-DRIVE-AXIS VEHICLE WITH A PLATFORM AND/OR A SEAT FOR A DRIVER

CROSS REFERENCE TO RELATED APPLICATIONS

The present document is based on German Priority Document DE 10 2007 045 146.8 filed in the German Patent Office on Sep. 20, 2007, the contents of which is incorporated herein by reference.

BACKGROUND OF THE INVENTION

1. Field of the Invention

The invention relates to a preferably electrically driven single-drive-axis vehicle, which may be referred to as a single-axle vehicle, with a platform and/or a seat for a driver.

2. Discussion of the Background

Such vehicles are known by the term scooter or personal transporter and are, for example, commercially available from the company Segway Inc., Bedford, N.H., USA, and presented in U.S. D528,486. In these vehicles, two wheels are arranged to the right and left of a footboard and can be respectively driven by a brushless electric motor in the wheel hubs.

During normal use, the footboard is in this case located under the axis of rotation of the wheels. Arranged under the footboard is a storage battery pack, by means of which the wheel-hub motors are supplied with electrical energy. Also provided is a control column with a handle, for example similar to the handlebars of a bicycle, the control column being pivotably mounted to a certain extent. The axis about which the control column with the handlebars can be pivoted in this case points in the direction of travel. The wheel-hub motors are activated by means of a regulating system with a number of gyroscopes and acceleration sensors.

Changes in the position of the centre of gravity are detected by the regulating system and corrected by suitable activation of the motors. This ensures that, when such a vehicle is operated, the unsteady equilibrium is maintained. Travel is controlled by appropriate weight displacement to the front or the rear. Such a vehicle is steered by moving the control column out to the sides. In accordance with the extent to which it is moved out, the rotational speeds of the motors on the right and left are changed, so that the desired radius of curve is obtained. Turning on the spot is likewise possible by activating one wheel in the forward direction and one wheel in the reverse direction.

Commercially available embodiments of such single-axle vehicles require a base area of less than 0.5 m$^2$, have a weight of the order of 50 kg together with a maximum speed of approximately 20 km/h and a range of 20 to 40 km on one battery charge. NiMh batteries or lithium-ion batteries are usually used as the storage batteries.

WO 2006/042302 A1 describes details of a controlling and position-regulating system with which a four-wheel, electrically operated vehicle for transporting one person can also be operated stably on only two wheels of one axle, if for example the front axle is raised. To this extent, such a vehicle is operated as a single-axle vehicle in the way described at the beginning.

Small electrically operated vehicles for transporting a single person are commonly used where relatively long distances have to be covered, considered on the one hand to be too far to cover on foot and on the other hand too short to justify the use of a motor car. Such vehicles are also used in locations that cannot be accessed by larger vehicles, or where cycles are traditionally used. Worksites or extensive building complexes are concerned for example. Furthermore, electrically driven vehicles are particularly used by elderly or disabled people, to enable them to get around further away from where they live.

In a similar way, small vehicles are also known for various work to be performed on correspondingly extensive properties or estates, for example for cleaning in buildings or areas of estates, or for example ride-on lawnmowers for mowing extensive areas of grass.

For people who already use a small electrically operated vehicle, for example elderly people, it has also been proposed to fit such an already existing vehicle with an attachment to reduce the investment outlay. An example of such a small electrically operated vehicle with an attachment formed as a lawnmower is described, for example, in US 2006/0090441 A1.

Another attachment, known for example from EP 1 180 342 A1, links small vehicles driven by muscle power, in this case a scooter with a front pair of steerable wheels of adequate track width, with an attachment to allow certain work to be performed more easily and quickly over large areas. In the case of the example described there, the attachment is a kind of wiping mop, to allow large interior areas to be cleaned quickly and efficiently, for example the walkways in a shopping centre. Particular advantages in the case of such a solution are the low weight, the low outlay required, the constant availability and the elimination of operating costs, apart from possibly required repairs.

However, the use of such vehicles is only possible on relatively smooth surfaces that allow low rolling and pushing resistance, so that the latter can be overcome relatively easily by the user.

None of the known solutions provides the possibility of making work easier in areas that present resistances to movement too great for muscle-powered vehicles but are so small or full of corners that four-wheeled electric carts with attachments do not represent a viable alternative to self-propelled machines, such as ride-on mowers.

SUMMARY OF THE INVENTION

The invention is therefore based on the object of providing an alternative to self-propelled machines or hand-operated machines that avoid or at least reduce the disadvantages of the known solutions with regard to their handling and their range of uses.

This object is achieved according to the invention by a single-drive-axis vehicle (a single-axle vehicle) which has two wheels that can be motor-driven about a common wheel axis providing the single-drive-axis to provide motive power and steering for the vehicle, and is characterized by at least one attachment or implement, the attachment or implement being connected to the single-axle vehicle pivotably about at least one first attachment axis.

A common wheel axis is to be understood here as meaning not only a geometrically exact coincidence of the axes of rotation of the two wheels but also any departure from this that is practical in technical terms, as long as the character of a two-track single-axle vehicle is retained. Such departures include, inter alia, angular deviations of the axes of rotation to set a desired wheel toe or a predetermined camber angle to influence the performance of the vehicle, or an offset of the axes of rotation to adapt to the existing installation space, including the arrangement of one or more drive motors.

The way in which a single-axle vehicle is formed according to the invention significantly extends the functional advantages of such a single-axle vehicle that is known per se. The invention makes it possible for example to use such single-axle vehicles in the running of buildings or properties, not only just as a means of transporting people but also for carrying equipment and consequently for performing various work, such as the maintenance of green spaces, for activities required in winter or for cleaning large areas. These additional advantages that are possible allow considerable investment costs to be saved, since separate self-propelled machines, such as for example ride-on mowers, are not additionally required for such purposes. The form of vehicle according to the invention also offers considerable advantages over the known ride-on machines for use in smaller buildings or green spaces, but in particular also in the private sector over the known electric carts with attachments, since a single-axle vehicle formed according to the invention has considerably greater maneuverability than such known small vehicles, and consequently can also efficiently work on green spaces that are highly contoured or full of corners or clean areas of buildings of a corresponding nature. Furthermore, the typical standing posture of the driver provides a particularly good overview, which further contributes to increasing efficiency and at the same time reduces the risk of accidents or damage.

In a preferred embodiment of the invention, the first attachment axis of the attachment or implement is arranged approximately parallel to the wheel axis and forms an included angle with the wheel axis of less than 30°, preferably no more than 15°, with particular preference less than 4.5°, and the attachment or implement has on its side opposite from the first attachment axis a supporting wheel or a supporting slide, in particular the supporting wheel is freely pivotable.

The preferred configuration ensures that the inclination about the wheel axis by the attachment or implement that is required for controlling the single axle vehicle is not adversely affected and, moreover, the single-axle vehicle with the attachment or implement deployed is well able to follow the contour of the underlying surface. The freedom of movement of the supporting wheel is also conducive to the particular maneuverability of the single-axle vehicle according to the invention with attachment.

A further preferred embodiment of the invention is characterized in that the attachment or implement is also connected to the single-axle vehicle pivotably about a second attachment axis, the second attachment axis being arranged approximately perpendicularly to the wheel axis and the first attachment axis and arranged approximately parallel to a vertical axis of the single-axle vehicle in normal operation, and the attachment or implement having on its side opposite from the first attachment axis a supporting wheel or a supporting skid, in particular such that the supporting wheel or the supporting skid is arranged so as to be fixed to the attachment or implement in the intended direction of travelling straight ahead.

This development according to the invention is particularly suitable for an uneven underlying surface, since greater track stability is ensured. The steering behaviour of this embodiment according to the invention thereby corresponds to that of vehicles with what is known as "articulated steering".

An advantageous form of the invention is characterized in that the attachment or implement is also connected to the single-axle vehicle pivotably about a third attachment axis, the attachment axes being arranged approximately perpendicularly to one another and the third attachment axis being arranged approximately parallel to a longitudinal axis of the single-axle vehicle in normal operation and running approximately centrally between the wheels, and the attachment or implement having on its side opposite from the first attachment axis at least two spaced-apart supporting wheels and/or supporting skids, in particular such that the supporting wheels and/or supporting slides are arranged so as to be fixed to the attachment or implement in the intended direction of travelling straight ahead and are preferably at a distance from each other that corresponds approximately to the track width of the single-axle vehicle.

The form of the single-axle vehicle according to the invention in this preferred embodiment provides the additional advantage over that described above of rotatability of the attachment or implement with respect to the single-axle vehicle with respect to the longitudinal axis of the latter, so that the attachment or implement is particularly well able to follow the contour of the terrain even when travelling over pronounced diagonal furrows. The steering behaviour of this embodiment likewise corresponds to that of a vehicle with articulated steering and a steered rear axle.

In this case, the connection between the at least one attachment or implement and the single-axle vehicle is formed particularly expediently by a ball coupling.

This form according to the invention also makes a particularly simple connection between the attachment or implement and the single-axle vehicle possible with standard parts and good mobility about all three axes.

In a particularly advantageous embodiment, the invention is characterized in that the first attachment axis is arranged near the wheel axis, and in the normal position for use of the single-axle vehicle above it, but preferably coincides with the wheel axis.

The form of the connection of the single-axle vehicle and the attachment or implement according to the invention, in particular in the preferred configuration, has the effect of largely or completely preventing raising or lowering of the rear edge of the attachment or implement when the single-axle vehicle is inclined forwards or rearwards for acceleration or deceleration. Consequently, a largely constant clearance of the attachment or implement from the ground is ensured.

It is expedient to arrange at least one attachment or implement at the front of the single-axle vehicle in the usual forward direction of travel.

This particularly preferred embodiment in conjunction with the standing position of the driver achieves the effect of a particularly good overview and allows work with such an attachment or implement to be carried out particularly precisely and at the same time quickly, with the greatest possible exclusion of damage or accidents.

A single-axle vehicle according to the invention is advantageously characterized in that the single-axle vehicle has a device for arresting the at least one attachment or implement in a position of rest that is raised with respect to the usual operating position, in particular in that the at least one attachment or implement can be pivoted from its usual operating position into the rest position about a pivot axis.

The form of this embodiment according to the invention makes it possible particularly easily to get to the work site and travel away from it again with the single-axle vehicle. The vehicle may also be used for transporting people without the attachment or implement in each case having to be detached.

The pivot axis is, particularly advantageously, the first attachment axis. This particularly preferred configuration produces a particularly simple, and consequently weight-saving and reliable construction of a single-axle vehicle according to the invention with an attachment or implement.

Furthermore, the object is achieved according to the invention by a battery for a single-axle vehicle according to the invention, the battery being a lithium-metal battery or lithium-ion battery, with a separator which has a ceramic surface and comprises a sheet-like flexible substrate that is provided with a multiplicity of openings and has a coating on and in this substrate, the material of the substrate being chosen from woven or unwoven electrically nonconductive natural or polymer fibres and the coating being a porous, electrically insulating, ceramic coating, and the separator in the battery being filled with an electrolyte composition that comprises a conducting salt and a base component, the base component having as its main constituent, with a proportion of greater than 50% by mass, at least one ionic liquid with a melting point lower than 100° C.

The form of a battery according to the invention for a single-axle vehicle according to the invention allows the invention to be used particularly effectively. The configuration of a battery according to the invention makes a considerably higher power density possible than in the case of known batteries, so that the energy requirement when travelling with an attachment or implement and for a motor-driven implement can also be covered for an adequately long period of time. Furthermore, the form according to the invention makes higher peak power possible, in particular higher discharge currents, so that load peaks, for example when travelling over obstacles, can be handled well. Furthermore, a greater quick-charging capability as compared with the known storage batteries is achieved, so that downtimes for charging the batteries can be reduced.

It is advantageous according to the invention if the electrolyte composition in this case has a base component comprising 80 to 95% by weight of at least one ionic liquid (A) with a melting point of less than 100° C., 0.5 to 10% by weight of a film former (B) and 0 to 10% by weight of a viscosity modifier (C), and a conducting salt (D), this conducting salt (D) being contained in the base component from 0.25 mol/(kg of the base component) up to the solubility limit, and the conducting salt (D) being a lithium compound.

The development of the battery according to the invention improves the resistance to decomposition during charging, so that such a battery is less sensitive to voltage peaks during the charging operation than conventional batteries of such a type. This makes it possible to make greater use of the reserves of such batteries and in this way significantly shorten the charging times.

According to the invention, it is advantageous in this respect if the separator comprises (A) a flexible, perforated carrier and (B) a porous first ceramic material, with which the perforations of the carrier are filled, the ceramic material (i) having a porous structure that is characterized by an average pore size and (ii) being suitable for receiving an electrolyte for ion conduction, and (C) the pore surface of the first porous ceramic material that can make contact with the electrolyte is covered with fine particles of a further material to increase the service life, the average particle size of the fine particles lying in the range from 0.5 to 30%, preferably 1 to 15%, of the average pore size of the ceramic material.

The development according to the invention of the battery according to the invention likewise improves the achievable peak power, lowers the internal resistance when there are high discharge currents and achieves a further improved quick-charging capability.

A particularly preferred battery according to the invention is characterized by a separator with a shutdown function, comprising a porous carrier with a porous inorganic, electrically nonconductive coating on and in this carrier, a porous shutdown layer of a material that melts at a predetermined temperature and closes the pores of the inorganic layer being present on the inorganic coating, which comprises oxide particles of the elements Al, Si and/or Zr with an average particle size of from 0.5 to 10 µm, the shutdown layer being formed by a porous sheet-like structure, and the carrier comprising woven or unwoven polymer or glass fibres.

The development of the battery according to the invention significantly improves safety for the single-axle vehicle according to the invention, in particular in cases in which the vehicle gets stuck or an electric short-circuit is been brought about in the cabling as a result of improper handling of garden tools or the like. The configuration of the battery according to the invention drastically reduces the short-circuit current of the battery when certain temperatures are exceeded by inhibiting the ion flow through the separators, so that the chance of the battery igniting or exploding and the risk of a fire being caused by a short-circuit in the cabling are virtually ruled out. The invention can be used particularly advantageously in the case of single-axle vehicles of the type described above with a battery such as that described above. For attachments or implements requiring a considerable amount of electrical energy, it is additionally particularly expedient if such an attachment or implement has a separate battery according to the invention.

Great safety from accidents in the case of an attachment or implement according to the invention for a single-axle vehicle is obtained if the at least one attachment or implement can be pivoted from its usual operating position into the rest position about a pivot axis by means of a pulling device, in the case of an electrically operated attachment or implement the pulling device being connected to a stop switch on the attachment or implement, so that the supply of current to one or more electric motors of the attachment or implement is interrupted as soon as the attachment or implement is raised from its operating position.

This attachment or implement according to the invention makes particularly efficient use of the single-axle vehicle according to the invention possible, since such an attachment or implement does not have to be detached from the single-axle vehicle even when it is not in use, and at the same time any risk of accident due to it being inadvertently switched on is ruled out to the greatest extent.

The invention can be commercially exploited particularly well if the attachment or implement is a lawnmower, in particular a reel-type mower, a bar mower or a rotary mower, preferably a rotary mower with two rotating cutter bars, a rotary snow plough, a snow dozer, a leaf blower, a polishing machine or a sweeping attachment, in particular with at least one circular brush and/or a sweeping roller.

Disturbances in the equilibrium of a single-axle vehicle according to the invention due to changes in the operating state of an attachment or implement, for example due to gyratory reactions when starting up a polishing brush of a large diameter, can be avoided by the controlling and position-regulating system if an attachment or implement according to the invention has a data interface for the transmission of operating parameters of the attachment or implement to the controlling and position-regulating system of the single-axle vehicle to compensate for disturbance variables that are produced by the operation of the attachment or implement, in particular due to changes in the operating state.

BRIEF DESCRIPTION OF THE DRAWINGS

The invention is to be explained in more detail below on the basis of exemplary embodiments that are represented in the drawings, in which.

DESCRIPTION OF THE PREFERRED EMBODIMENTS

Figure 1:
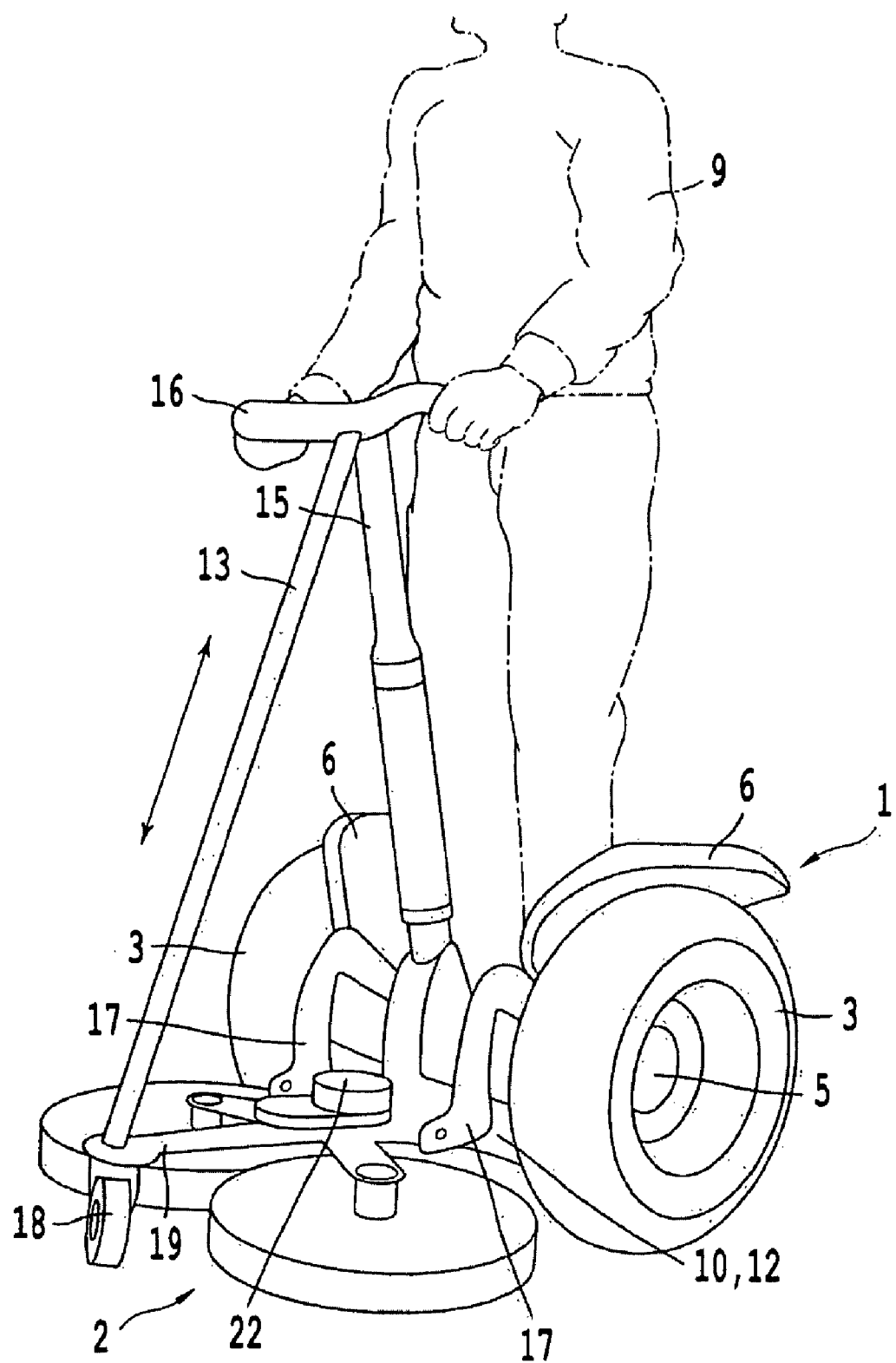
FIG. 1 shows a single-axle vehicle according to the invention with a lawnmower as an attachment or implement.

In FIG. 1, a single-axle vehicle according to the invention is represented, designated overall by 1, with a lawnmower attached to it, designated overall by 2, as an attachment or implement. The single-axle vehicle 1 includes firstly two wheels 3, the axes of rotation of which form a common wheel axis 4. The wheels 3 can be individually electrically driven by means of wheel-hub motors 5. These are advantageously brushless electric motors. The single-axle vehicle 1 also comprises a platform 7 with a footboard 8 on the upper side (on which a driver 9 can stand).

Figure 2:
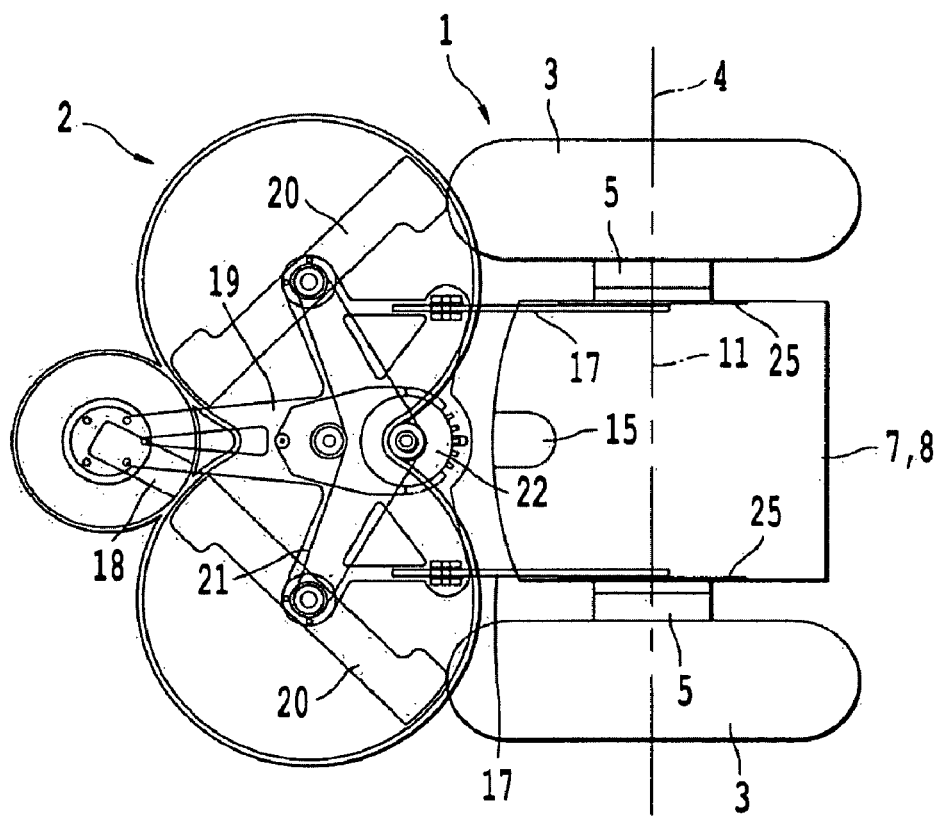
FIG. 2 shows a plan view of a single-axle vehicle according to the invention with an attachment depicted in the section of a detail, some of the components having been omitted or shown ghosted for the sake of overall clarity.
Figure 3:
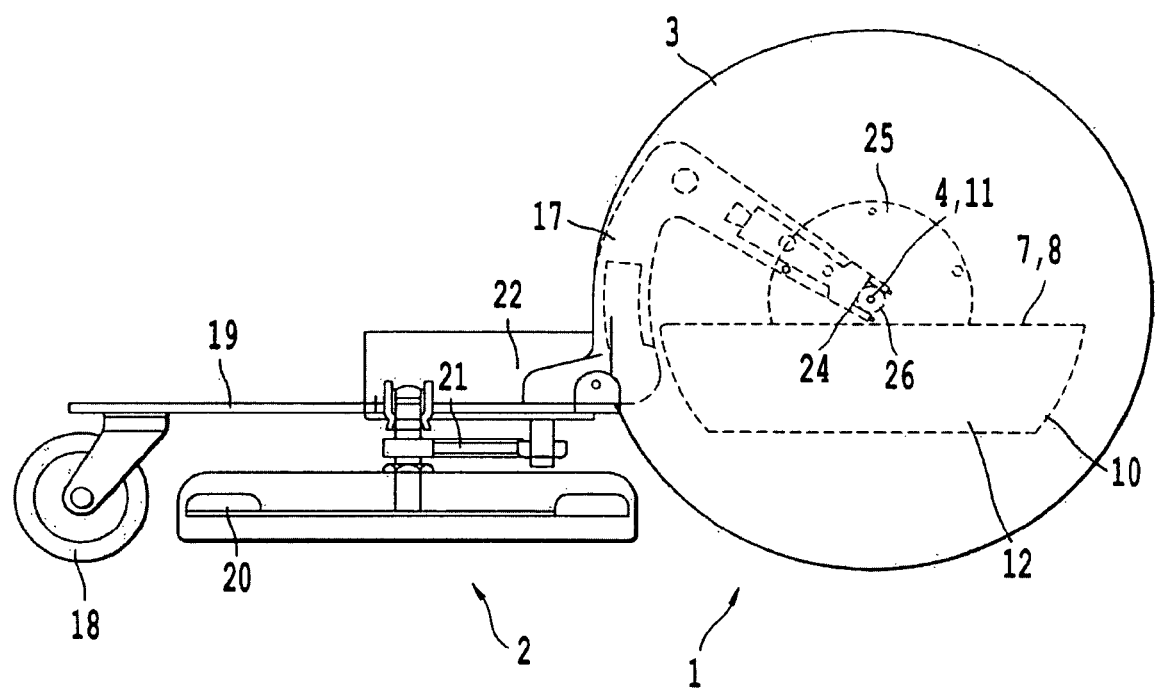
FIG. 3 shows a schematic longitudinal section through the single-axle vehicle from FIGS. 1 and 2.

Under the platform 7 there is a housing 10 for receiving the electronics (not represented) of the drive-controlling and position-regulating system of the single-axle vehicle 1, as can be seen from FIGS. 2 and 3. Also provided in the housing 10 is a battery pack 12 for storing and providing the electrical energy for the electronics and the drive of the wheel-hub motors 5.

It is preferred according to the invention that the battery pack 12 is formed by a lithium-metal battery or a lithium-ion battery, with a separator which has a ceramic surface and comprises a sheet-like flexible substrate that is provided with a multiplicity of openings and has a coating on and in this substrate. In some aspects, the material of the substrate being chosen from woven or unwoven electrically nonconductive natural or polymer fibres and the coating being a porous, electrically insulating, ceramic coating. Also, the separator in the battery is preferably filled with an electrolyte composition which advantageously includes a conducting salt and a base component, where the base component has at least one ionic liquid with a melting point lower than 100° C. as its main constituent, with a proportion of greater than 50% by mass. The electrolyte composition preferably a base component comprising 80 to 99.5% by weight of at least one ionic liquid (A) with a melting point of less than 100° C., 0.5 to 10% by weight of a film former (B) and 0 to 10% by weight of a viscosity modifier (C), and a conducting salt (D).

In this non-limiting example, this conducting salt (D) is contained in the base component from 0.25 mol/(kg of the base component) up to the solubility limit, and the conducting salt (D) is preferably a lithium compound. The separator can include a flexible, perforated carrier and a porous first ceramic material, with which the perforations of the carrier are filled. The ceramic material can have a porous structure that is characterized by an average pore size which is suitable for receiving an electrolyte for ion conduction. The pore surface of the first porous ceramic material can make contact with the electrolyte and is preferably covered with fine particles of a further material to increase the service life. The average particle size of the fine particles preferably lies within the range of 0.5 to 30%, and more preferably within 1 to 15%, of the average pore size of the ceramic material. Electrical separators for batteries, in particular lithium batteries, and methods for their production are known, for example, from DE 10 142 622 A1 and DE 103 47 569 A1.

With a storage capacity of about 1-2 kWh, the batteries allow the single-axle vehicle to be operated for at least about 1-2 hours without recharging. Very quick recharging of the batteries within only 0.5 hour allows them to be used again within a short time.

Provided approximately centrally on the front side of the platform 7 is a control column 15, which is adjustable in length and at its upper end has handles 16, similar to the handlebars of a bicycle. The driver 9 expediently grips the handles on the handlebars to control the vehicle 1. By displacing his/her weight forwards or backwards, the vehicle 1 is accelerated or braked or made to reverse. For this purpose, the position-regulating system of the vehicle 1 is provided with a series of gyroscope sensors, which are not represented any more specifically here. At least three gyroscope sensors are required, with others provided for redundancy for reasons of safety.

Acceleration sensors are also provided. By recording the measured values about 100 times per second, all the relevant data for setting the vehicle in motion and maintaining stable equilibrium are recorded and processed and the wheel-hub motors 5 are appropriately activated both to execute the desired travel commands and to keep the vehicle 1 in equilibrium. Travelling in a curve is initiated by pivoting the control column 15 to the side, the matching curve radius being activated by the control system in dependence on the speed, and consequently the centrifugal forces, by setting differences between the rotational speeds of the wheels 3. It is also possible to turn the vehicle 1 on the spot about its vertical axis, one wheel 3 then being activated in reverse.

Figure 6:
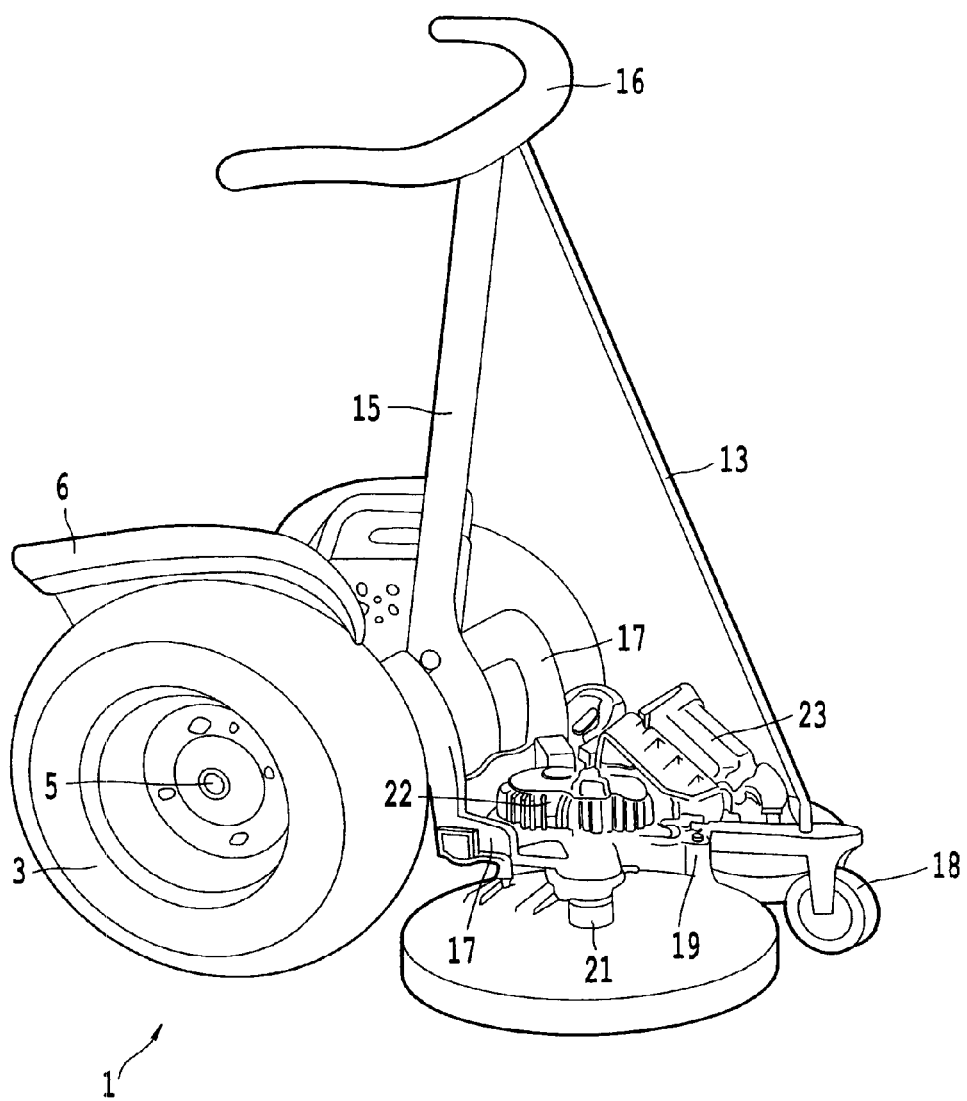
FIG. 6 shows a perspective view in the form of a detail of the single-axle vehicle from FIGS. 1 to 5; and, FIG. 7 shows an alternative embodiment of a single-axle vehicle according to the invention with an attachment or implement in the form of an electrically driven polishing machine for floors.

Finally, the wheels are also respectively covered by a mudguard 6, both to protect the driver 9 from dirt and to avoid the driver 9 coming into contact with the rotating wheels 3 and the concomitant risk of accident. A single-axle vehicle according to the invention, as depicted in FIG. 6, is provided as standard for speeds of up to 20 km/h.

The attachment or implement is a sickle lawnmower 2 with two rotating cutter bars 20. These are driven by an electric motor 22, by means of a common toothed belt 21. On account of the high power consumption of such a lawnmower, it is most preferable in this case if the lawnmower 2 has a battery pack 23 of its own, which expediently contains batteries of the same type, as already described further above for the single-axle vehicle 1 (see FIG. 6). In the case of the non-limiting exemplary embodiment represented, the cutters 20 rotate in the same direction during operation.

The drive motor 22 and the cutter bars 20 are mounted in a common frame 19, which on the side opposite from the single-axle vehicle 1 and the connection to the single-axle vehicle 1 also carries a supporting wheel 18. The supporting wheel 18 is a support which serves the purpose of supporting the lawnmower 2 on the front side and of maintaining the necessary distance between the mowing mechanism (cutter bar 20) and the ground. Such a supporting wheel 18 is expediently made adjustable in height, in order to allow the cutting height of the lawnmower 2 to be set. Choice of a suitable cutting height also allows the power consumption to be optimized, and thereby also the usable operating time of the batteries.

Figure 5:
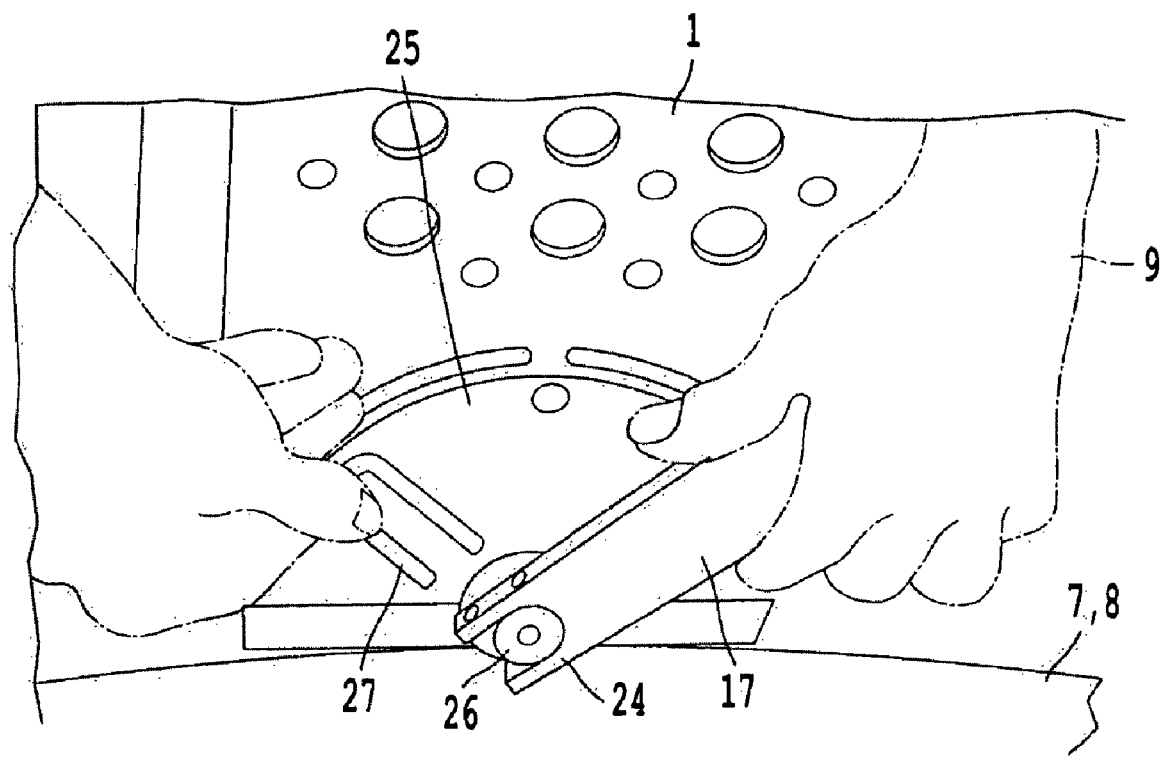
FIG. 5 shows a view of a detail of the single-axle vehicle according to the invention from FIGS. 1 to 4.

The frame 19 of the lawnmower 2 is also connected to two mounts 17, which are preferably at a distance from each other that corresponds to the width of the platform 7 (see FIGS. 2 and 3). These mounts 17 can have a sickle shape in side view and are provided at the end that is not connected to the frame 19 of the lawnmower 2 with a receptacle 24. On both sides of the platform 7, adapter plates 25 are fixedly connected to the single-axle vehicle 1 and have a journal 26, the axis of which preferably lies in the wheel axis 4. The receptacle 24 in the mount 17 can be fitted onto the journal 26 and secured there, for example without a tool, by means of a clip 27, as shown in FIG. 5, so that the mount 17 can pivot about the journal 26 and consequently about the wheel axis 4. This defines a first attachment axis 11 of the attachment or implement, which with particular preference coincides with the wheel axis 4.

The lawnmower 2 is consequently pivotable with respect to the single-axle vehicle 1 about the first attachment axis 11, so that the single-axle vehicle 1 can tilt forwards and backwards about the wheel axle 4 by the angular clearance given by the sickle shape of the mount 17, in order to be able to perform the necessary movements for controlling the travel and stabilizing the position.

It is particularly advantageous if the first attachment axis 11 coincides with the wheel axis 4. This ensures that the fastening points 24 of the lawnmower 2 do not undergo any changes in height with respect to the underlying surface when the single-axle vehicle 1 is inclined forwards or backwards, and consequently an undesired adjustment of the height of the cutting mechanism, i.e. the cutter bars 20, of the lawnmower 2 is avoided.

If items of equipment required for winter activities, such as rotary snow ploughs or the like, are used instead of a lawnmower 2, it is expedient to provide skids instead of the supporting wheel 18.

To comply with high safety standards that apply to motor-operated lawnmowers 2 and for the best possible reduction of the risk of accident, the single-axle vehicle 1 may be provided on its handle 16 or the handlebars of the control column 15 with a safety switch (not represented), which brings about an emergency shutdown of the attachment or implement 2 if the safety switch is not operated and released again within a predetermined time period, or if the safety switch is not constantly operated, depending on the preferred safety philosophy. As an alternative or in addition, a contact switch (not represented), which brings about an emergency shutdown of the attachment or implement 2 if the platform 7 is not subjected to the adequate weight of a driver, may be provided on the footboard 8 of the platform 7. This has the effect, for example of making it more difficult for the attachment or implement 2 to be put into operation by children. Furthermore, an emergency shutdown can be performed if the driver 9 falls off the vehicle and does not trigger the safety switch because the driver 9 is still attempting to hold on by the handle 16 of the control column 15.

Figure 4:
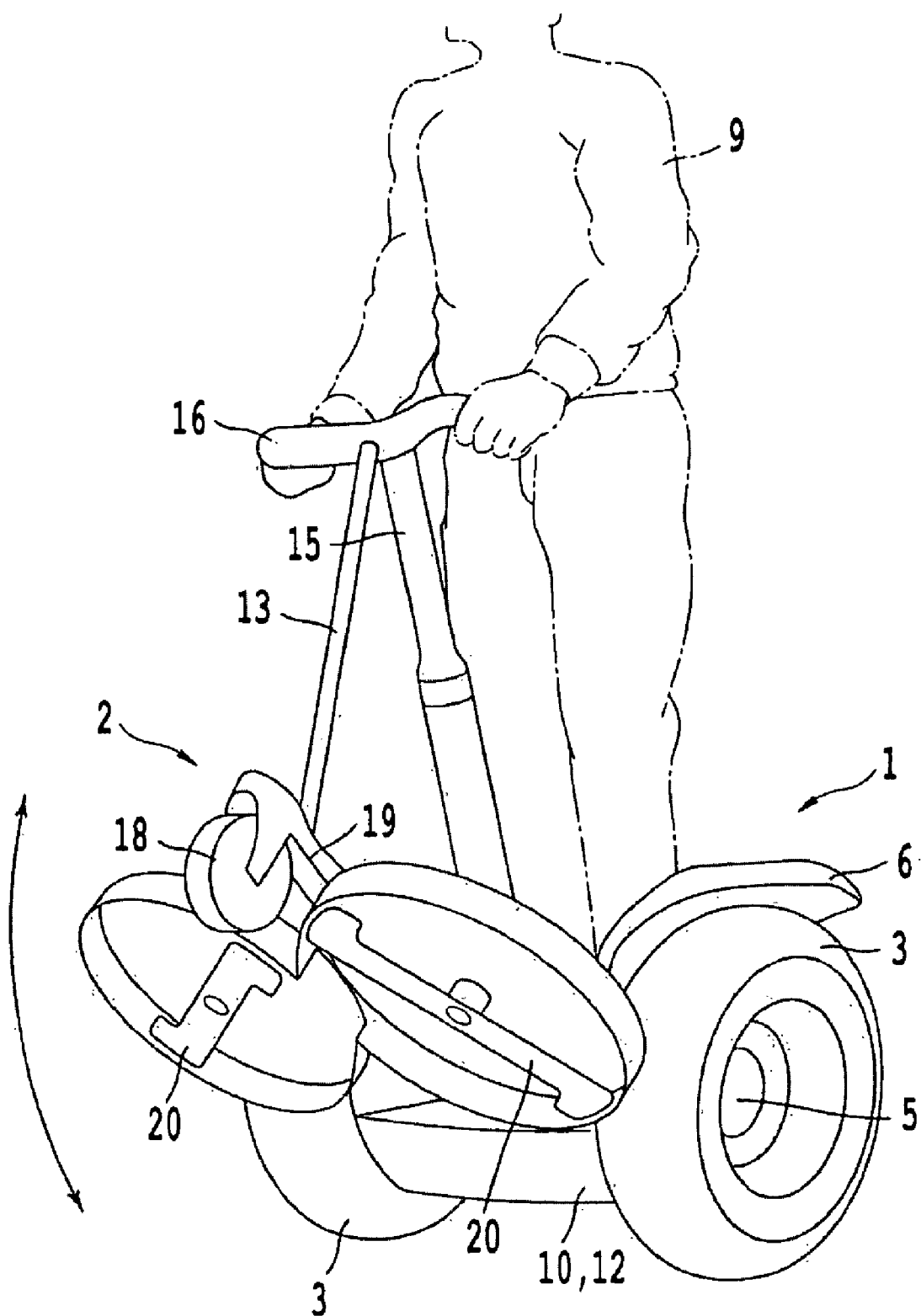
FIG. 4 shows the single-axle vehicle according to the invention from FIG. 1 with a lawnmower pivoted into the rest position.

In FIG. 4, a single-axle vehicle 1 according to the invention with a lawnmower 2 as the attachment or implement is shown, the lawnmower 2 having been pivoted from its usual operating position, represented in FIG. 1, into the rest position, represented in FIG. 4, about a pivot axis. In the case of the embodiment of the single-axle vehicle 1 represented in this non-limiting example, the pivot axis is the first attachment axis 11. Serving for this purpose is a pulling device 13, which is an adjuster for a pivot position of the attachment and may be formed for example by a strap such as that usually used as a lashing strap for securing loads. In this case, a release position is expediently provided, so that the lawnmower 2 assumes the operating position from FIG. 1, the pulling strap 13 in this case having to have sufficient slack to ensure adequate angular freedom of movement between the single-axle vehicle 1 and the lawnmower 2, on the one hand to allow the tilting movements necessary for controlling the single-axle vehicle 1 to be carried out unhindered and on the other hand to ensure that the lawnmower 2 can also mow a downward slope, since the position of the single-axle vehicle 1 is oriented on the basis of the gravitational field and not determined by the inclination of the contact area, as in the case for example of four-wheeled vehicles. In the second operating position, the pulling device 13 must pivot the lawnmower 2 up so far that the lawnmower 2 does not come into contact with the ground as a result of the tilting movements of the single-axle vehicle 1 to control it or to travel over ramps. In the case of the lawnmower 2, the pulling device 13 is connected to a stop switch, so that the current supply to the electric motor 22 of the lawnmower 2 is interrupted as soon as the lawnmower 2 is raised from its operating position.

Instead of a pulling device 13 in the form of a pulling strap it would be quite possible to use a telescopic tube device that has a sufficiently great range of telescopic movement between the operating position of the lawnmower 2 over every conceivable type of terrain and the rest position, as represented in FIG. 4.

At the same time it would be necessary to provide a telescopic device with sufficiently low friction to avoid frictional damping of the tilting movement of the single-axle vehicle 1 with respect to the lawnmower 2, which would noticeably disturb the positional regulation of the single-axle vehicle 1 and consequently lead at least to uncomfortable operating behaviour.

FIG. 5 shows a detail of the receptacles 24 in mounts 17 during the assembly on the journal 26 of the adapter plate 25 by means of the clip 27.

In FIG. 6, a single axle vehicle 1 described above with a lawnmower 2 is represented in more detail.

Figure 7:
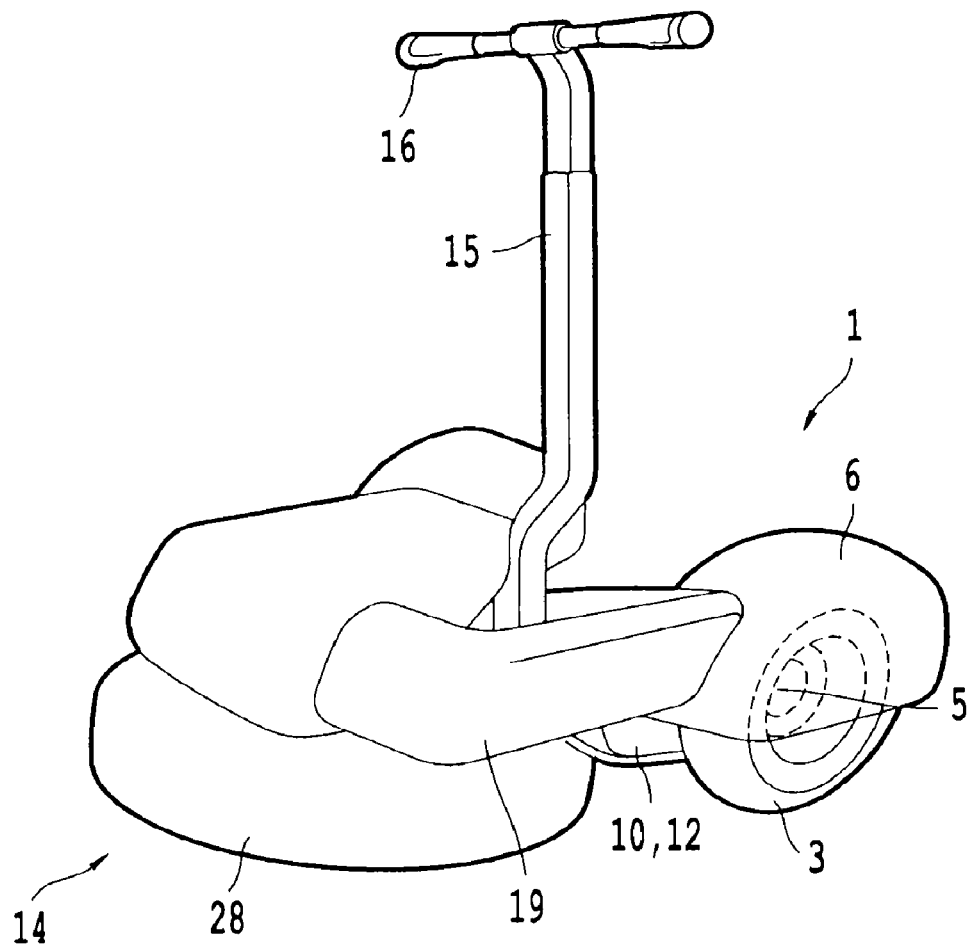

In FIG. 7, an alternative embodiment of a single-axle vehicle 1 according to the invention with an attachment or implement in the form of an electrically driven polishing machine 14 for floors is represented. It can be provided that the polishing machine 14 is attached to the single-axle vehicle 1 in the same way as in the case of the lawnmower 2, but it may be attached approximately parallel to the longitudinal axis of the overall vehicle by the provision of additional angular freedom of movement about a second attachment axis. This allows the polishing wheel or polishing brush that is arranged in a housing 28 particularly to follow the contour of the underlying surface to be worked, which leads to particularly good working results. The function of one or two supporting slides instead of the supporting wheel is undertaken here by the polishing wheel or brush in the housing 28.

Further configurations and forms of the single-axle vehicle 1 according to the invention with an attachment or implement 2 are possible within the scope of the overall disclosure of this application. The particular examples disclosed herein should not be view as limiting but merely examples of the invention as claimed.

The invention claimed is:

1. A single-drive-axis vehicle comprising:
a base structure;
at least two motorized wheels having respective wheel axles which share a common axis of rotation about a wheel axis forming the single-drive-axis;
a first attachment pivotably secured to a first attachment axis, the first attachment axis coinciding with the wheel axis, the first attachment being pivotable relative to the base structure about the first attachment axis, and the first attachment including a tool and a motor to power the tool, wherein the motor is disengaged from the tool if the tool is pivotably raised above an operating level; and a support disposed along a side of the first attachment substantially opposite the first attachment axis, wherein the support is operatively arranged to engage terrain on which the vehicle is traversing via the motorized wheels.

2. The vehicle according to claim 1, further comprising:
a control column; and
an attachment adjuster extending from the first attachment to the control column.

3. The vehicle according to claim 2, wherein the attachment adjuster selectively controls a pivot angle of the first attachment relative to the base structure.

4. The vehicle according to claim 3, wherein the attachment adjuster is operatively arranged to vary the pivot angle of the first attachment so as to maintain a substantially parallel relationship with terrain located directly below the first attachment.

5. The vehicle according to claim 1, wherein the first attachment axis is arranged substantially parallel to the wheel axis.

6. The vehicle according to claim 5, wherein the first attachment axis forms an included angle with the wheel axis of less than 30°.

7. The vehicle according to claim 6, wherein the included angle is less than 4.5°.

8. The vehicle according to claim 1, wherein the support is freely pivotable.

9. The vehicle according to claim 1, wherein the support includes at least one of a wheel, a slide and a skid.

10. The vehicle according to claim 1, wherein the support is fixed in a direction of traveling straight ahead.

11. The vehicle according to claim 1, further including a second support, wherein both the support and the second support are arranged substantially along a track width of the vehicle.

12. The vehicle according to claim 1, wherein the first attachment is pivotably secured to the first attachment axis by a ball coupling.

13. The vehicle according to claim 1, further including means for pivotably raising and lowering the first attachment relative to the base structure.

14. The vehicle according to claim 13, further including an arresting device for maintaining the first attachment in a raised position.

15. The vehicle according to claim 1, further including:
at least one battery; and
at least one electric motor.

16. The vehicle according to claim 1, wherein the tool is an electrically powered tool and the motor is an electric motor.

17. The vehicle according to claim 16, wherein the electric motor for the electrically powered tool is disengaged if the tool is pivotably raised above an operating level by a stop switch to stop a current supply to the electric motor.

18. The vehicle according to claim 1, wherein the first attachment is selected from a list consisting of a lawnmower, a reel mower, a bar mower, a rotary mower, a rotary mower having two rotating cutter bars, a rotary snow plough, a snow dozer, a leaf blower, a polishing machine, a sweeping attachment and a sweeping attachment having at least one circular brush.

19. The vehicle according to claim 1, further including:
a data interface configured with the first attachment; and
a position regulating system,
wherein the data interface transmits operating parameters of the first attachment to the position regulating system to compensate for disturbance variables and changes in an operating state of the first attachment.

20. The vehicle according to claim 1, further comprising a lithium-ion or lithium metal battery, wherein the battery includes:
a separator having a ceramic surface and filled with an electrolyte composition, wherein the electrolyte composition includes a conducting salt and a base component, and the base component includes at least one ionic liquid with a melting point lower than 100° C. in a proportion of greater than 50% by mass; and
a flexible substrate having a plurality of openings and a ceramic coating, wherein the substrate is electrically non-conductive and fibrous, and the ceramic coating is porous and electrically insulating.

21. The vehicle according to claim 20, wherein the base component of the electrolyte composition includes:
80 to 99.5% by weight of at least one ionic liquid with a melting point of less than 100° C.;
0.5 to 10% by weight of a film former;
0 to 10% by weight of a viscosity modifier; and
a lithium compound conducting salt,
wherein the conducting salt concentration in the base component is in a range from 0.25 mol/(kg of the base component) up to the solubility limit.

22. The vehicle according to claim 20, wherein the separator further comprises a flexible perforated carrier coated with a porous first ceramic material, wherein the first ceramic material includes:
a porous structure having an average pore size arranged for receiving an electrolyte for ion conduction, and
a porous surface of the first ceramic material arranged to contact the electrolyte composition is covered with fine particles of a further material to increase the service life,
wherein an average particle size of the fine particles is in the range of 0.5 to 30% of the average pore size of the ceramic material.

23. The vehicle according to claim 22, wherein the average particle size of the fine particles is in the range of 1 to 15% of the average pore size of the ceramic material.

24. The vehicle according to claim 22, wherein the separator of the battery further includes means for shutting down, the means for shutting down including:
a porous carrier with a porous inorganic, electrically non-conductive coating on and in the porous carrier, wherein the porous carrier includes polymer or glass fibers; and
a porous shutdown layer of a material that melts at a predetermined temperature and closes the pores of the porous inorganic, electrically nonconductive coating, wherein the porous shutdown layer includes at least one oxide particles of the elements Al, Si and Zr, the at least one oxide particles having an average particle size range of 0.5 to 10 μm, and the shutdown layer is formed from a porous film structure.

25. A single-drive-axis vehicle comprising:
a base structure;
at least two motorized wheels having respective wheel axles which share a common axis of rotation about a wheel axis forming the single-drive-axis;
a first attachment pivotably secured to a first attachment axis, the first attachment axis coinciding with the wheel axis, the first attachment being pivotable relative to the base structure about the first attachment axis, and the first attachment including a tool and a motor to power the tool, wherein the motor is disengaged from the tool if the tool is pivotably raised above an operating level; and means for supporting the first attachment at a distal end of the first attachment, wherein the means for supporting the first attachment engages terrain on which the vehicle is traversing via the motorized wheels.

26. The vehicle according to claim 25, further comprising:
means for pivotably raising and lowering the first attachment relative terrain on which the single axle vehicle is traversing.

27. The vehicle according to claim 26, wherein the means for pivotably raising and lowering the first attachment is automatically controlled by a controller, and the controller is arranged to pivot the first attachment so as to maintain a substantially parallel relationship with terrain located directly below the first attachment when the first attachment is in an engaged position.

28. The vehicle according to claim 1, wherein the base structure includes a seat.

29. The vehicle according to claim 1, wherein the first attachment is positioned in front of the base structure from the perspective of operating the single-drive-axle vehicle in a forward direction.

30. The vehicle according to claim 1, wherein the first attachment is pivotably secured to the wheel axles.

31. The vehicle according to claim 1, wherein
the base structure includes a portion positioned between the motorized wheels to support a user, and
the motorized wheels are coupled to the portion by respective drive motors.

32. The vehicle according to claim 31, wherein
the portion is a platform for the user to stand on while operating the vehicle, and
a top surface of the platform substantially coincides with or is below the wheel axis.

* * * * *